Patented Aug. 13, 1935

2,010,918

UNITED STATES PATENT OFFICE 2,010,918

MANUFACTURE OF SOLUTIONS OF SILK FIBROIN

Heinrich Fink, Wolfen Kreis Bitterfeld, Kurt Weber, Stockhausen, near Sondershausen, and Lothar von Wistinghausen, Wolfen Kreis Bitterfeld, Germany, assignors to I. G. Farbenindustrie Aktiengesellschaft, Frankfort-on-the-Main, Germany No Drawing. Application July 16, 1932, Serial No. 623,014. In Germany July 31, 1931

10 Claims. (Cl. 134—1)

Our present invention relates to the manufacture of solutions of silk fibroin and more particularly to aqueous solutions of silk fibroin.

The object of our present invention is a process of transforming silk fibroin, by means of liquid ammonia with the simultaneous utilization of salts, into a structureless swollen form and then making it into aqueous solutions.

In the copending application Ser. No. 499,839, filed December 3, 1930 by Fink and Rossner there has been described a process of dissolving silk fibroin in liquid ammonia and converting these solutions into aqueous fibroin solutions by introducing them into water and simultaneously eliminating the ammonia. According to another process described in the copending application Ser. No. 548,048, filed July 6, 1931 by Fink and Rossner, the ammoniacal fibroin solution is evaporated, whereby the fibroin is obtained in a finely divided form as a dry substance which is then dissolved in water. In both cases the whole quantity of ammonia required for the production of the fibroin solutions, as a rule 6 to 8 times the weight of fibroin, has to be evaporated.

It has now been found that by the use of salts which are soluble in ammonia, the reaction of the ammonia with fibroin may be such that the latter is converted into the form of a viscous to gum-like mass which contains only 2.5 to 4 parts of ammonia to 1 part of fibroin, said mass being well suited for the preparation of aqueous solutions of fibroin. The fibroin may first be dissolved in ammonia and then precipitated by addition of the solid salt or an ammoniacal solution thereof, or the fibroin may be introduced into the solution of the salt in liquid ammonia, whereby it is not dissolved, but transformed, while losing its fibrous structure, into a gum-like, translucent mass which can easily be separated from the ammoniacal mother liquid. A special form of this latter procedure consists in impregnating the fibroin with the salt by immersing the fibroin in an aqueous solution of the salt, then centrifuging and drying it and finally introducing the impregnated fibroin into ammonia which in this case need not contain a salt or may contain only a small amount thereof.

Suitable salts are those of the alkalies, alkaline earths and heavy metals which have the required solubility in liquid ammonia and especially at a temperature near −77° C. that is near the freezing point of ammonia. Of these salts particularly the nitrates, rhodanates and nitrites enter into consideration. Only those chlorides and acetates are suitable which are soluble in liquid ammonia. The fluorides, sulfates and carbonates are practically of no value since these salts are insoluble in liquid ammonia. For equal concentrations of the alkali metal salts the potassium salts are more active than are the sodium salts. Moreover the fibroin precipitates obtained by means of potassium salts contain the smaller amount of ammonia. After the reaction is complete the salt content of the swollen and structureless fibroin is, as compared to the amount of ammonia simultaneously absorbed, higher than the salt content of the mother liquid. Besides the neutral salt, the fibroin binds always a certain quantity of the cation of the salt added, the corresponding anion being set free and forming, together with the ammonia, the corresponding ammonium salt. It may be due to this phenomena that the ammonium salts are not suited for the invention and even prevent the formation of a paste when present in too high a concentration.

For the best result, the amount of ammonia and ammoniacal salt solution respectively which is caused to act upon a determined quantity of fibroin must not be too small. Otherwise the fibroin will be only dissolved partly, or it will be dissolved wholly and, according to the mode of operation, partly or wholly remain in solution, despite the presence of the salt. In general the application of 15 to 25 times the quantity of ammonia calculated on 1 part by weight of fibroin will be sufficient. Strongly degraded fibroin requires larger quantities of ammonia than that not damaged. By stirring thoroughly the complete separation of the fibroin can be promoted. When the process is carefully executed the organic substance still contained in the mother liquid will amount to not more than 1 to 2% of the weight of the fibroin applied.

The temperature at which the fibroin is treated with the ammonia containing the salt influences the subsequent dissolution of the fibroin in water inasmuch as the solubility in water is the more complete, the lower is the temperature during the treatment. Particularly when applying fibroin which has been degummed under mild conditions it is advantageous to maintain the temperature as closely at the crystallization point of the ammonia as possible, at any rate below −70° C. until the structureless mass of fibroin, salt and ammonia has been formed. By a preliminary treatment of the degummed fibroin with a dilute organic acid, such as dilute acetic acid, formic acid or the like, the solubility is likewise favorably influenced.

The swollen fibroin mass is transformed into an aqueous fibroin solution in the manner as described for the production of aqueous fibroin solutions from ammoniacal fibroin solutions in the copending applications Serial numbers 499,839 and 548,048 already cited. The swollen mass is introduced into the required quantity of water and the ammonia is simultaneously removed by suction or blowing a gas through the mixture, or the fibroin is given the form of thin skins practically free from ammonia by rolling it between heated rollers, said skins being then dissolved in water. In both cases it will be advisable to stir strongly during the dissolution.

The following examples illustrate our invention:

Example 1.—5 kilos of degummed fibroin are dissolved in 103 kilos of liquid ammonia of minus 77° C. and 2.5 kilos of powdered potassium thiocyanate are added while stirring. When stirring is continued the flocculent precipitate clods; it is then separated from the mother liquid and dried on heated rollers in the form of thin skins while the ammonia is at the same time sucked away. In an agitator the dry fibroin is dissolved in water to form a solution which contains 15% of fibroin, 1.73% of KCNS, 0.28% of potassium which can be titrated as KOH, and 0.02% of ammonia. After filtering or centrifuging the solution can be spun.

Example 2.—4.5 kilos of degummed fibroin are dissolved in 103 kilos of ammonia at minus 76° C. and then precipitated, while vigorously stirring, by addition of 2.5 kilos of magnesium nitrate $(MgNO_3)_2.4H_2O$. Stirring and cooling are continued for 10 minutes; the mass is separated from the mother liquid and dissolved in a vacuum kneading machine by means of water to a solution which contains 12% of fibroin, 1.04% of magnesium nitrate, 0.07% of magnesium oxide capable of being titrated and 0.5% of ammonia.

Example 3.—5 kilos of degummed silk wastes are soaked in an 8% aqueous solution of potassium thiocyanate, centrifuged and dried. In this manner the material has become impregnated with 0.45 kilo of potassium thiocyanate. The impregnated material is then introduced into a solution of 1 kilo of potassium thiocyanate in 103 kilos of ammonia cooled to —77° C. and the whole is stirred for 40 minutes. The fibrous structure has disappeared and a viscous, structureless mass is obtained which is separated from the mother liquid and either is first converted into the dry form by rolling it by means of heated rollers and eliminating the ammonia by suction, and then dissolved in water, or is immediately dissolved in water in a vacuum kneading machine while vigorously stirring. The aqueous solution contains 18% of fibroin, 1.46% of potassium thiocyanate, 0.22% of potassium capable of being titrated, and 0.2% of ammonia.

Example 4.—Silk wastes are degummed by means of soap and boiled for 30 minutes with formic acid of 3 per cent strength. 2 kilos of the dry material are introduced into 41.2 kilos of ammonia at minus 77° C. which contains 1 kilo of dissolved potassium nitrate, and the whole is stirred for one hour. The structureless mass formed is separated from the mother liquid and made into an aqueous solution as indicated in Example 3. The aqueous solution contains 14.8% of fibroin, 1.23% of potassium nitrate, 0.3% of potassium capable of being titrated, and 0.5% of $NH_3$.

Example 5.—5 kilos of the same starting material as used in Example 4 are placed in a solution of 10 kilos of anhydrous calcium nitrate in 412 kilos of ammonia of minus 70° C. and stirred for one hour. The further treatment is as indicated in Example 3. The aqueous solution contains 10% of fibroin, 1.19% of $Ca(NO_3)_2$, 0.13% of calcium capable of being titrated and 0.5% of $NH_3$.

Example 6.—2 kilos of the same starting material as used in Example 4 are placed in a solution cooled to minus 75° C. of 1 kilo of $Cu(NO_3)_2.2H_2O$ in 41.2 kilos of ammonia and stirred for 40 minutes. The structureless deep-blue mass obtained is separated from the mother liquid and dissolved in water in a vacuum kneading machine. The aqueous solution contains 18.5% of fibroin, 1.67% of copper nitrate, 0.41% of copper capable of being titrated, and 0.71% of ammonia. The properties of the blue aqueous solution are quite different from those of a fibroin solution of the same fibroin content but obtained by dissolving fibroin in ammoniacal copper oxide; its viscosity, in particular, is much smaller.

What we claim is:

1. The process of manufacturing solutions of silk fibroin which comprises transforming degummed silk into a structureless swollen mass by the action of liquefied ammonia and an inorganic salt soluble in liquefied ammonia and selected from the group consisting of alkali metal salts, alkaline earth metal salts and heavy metal salts, and dissolving said mass in water while evaporating the ammonia.

2. The process of manufacturing solutions of silk fibroin which comprises dissolving degummed silk in liquefied ammonia at a temperature below —60° C., precipitating the dissolved fibroin by means of an inorganic salt soluble in liquefied ammonia and selected from the group consisting of alkali metal salts, alkaline earth metal salts and heavy metal salts, separating the structureless precipitate, and dissolving said precipitate in water while evaporating the ammonia still contained in said mass.

3. The process of manufacturing solutions of silk fibroin which comprises dissolving in liquefied ammonia an inorganic salt selected from the group consisting of alkali metal salts, alkaline earth metal salts and heavy metal salts, cooling the solution to a temperature below —60° C., adding degummed silk, stirring the mixture, separating the structureless mass which is formed, and dissolving said precipitate in water while evaporating the ammonia still contained in said mass.

4. The process of manufacturing solutions of silk fibroin which comprises impregnating degummed silk with an inorganic salt soluble in liquefied ammonia and selected from the group consisting of alkali metal salts, alkaline earth metal salts and heavy metal salts, adding the impregnated silk to liquefied ammonia cooled to a temperature below —60° C., stirring the mixture, separating the structureless mass which is formed, and dissolving said mass in water while evaporating the ammonia still contained in said mass.

5. The process of manufacturing solutions of silk fibroin which comprises dissolving degummed silk in liquefied ammonia at a temperature below —60° C., precipitating the dissolved fibroin by means of a salt selected from the group consisting of nitrates, rhodanates, nitrites, of alkali metals, alkaline earth metals and heavy metals, separating the structureless precipitate, and dissolving said precipitate in water while evaporating the ammonia still contained in said mass.

6. The process of manufacturing solutions of silk fibroin which comprises dissolving in liquefied ammonia a salt selected from the group consisting of nitrates, rhodanates, nitrites, of alkali metals, alkaline earth metals and heavy metals, cooling the solution to a temperature below —60° C., adding degummed silk, stirring the mixture, separating the structureless mass which is formed, and dissolving said mass in water while evaporating the ammonia still contained in said mass.

7. The process of manufacturing solutions of silk fibroin which comprises dissolving degummed silk in liquefied ammonia at a temperature of about —77° C., precipitating the dissolved fibroin by means of potassium thiocyanate, separating the structureless precipitate, and dissolving said precipitate in water while evaporating the ammonia still contained in said mass.

8. The process of manufacturing solutions of silk fibroin which comprises dissolving 1 part by weight of $Cu(NO_3)_2.2H_2O$ in 41.2 parts by weight of liquefied ammonia, cooling the mixture to about —75° C., adding 2 parts by weight of degummed silk while stirring, separating the structureless deep-blue mass formed, and dissolving said mass in water while evaporating the ammonia still contained in said mass.

9. The process of manufacturing solutions of silk fibroin which comprises impregnating 5 parts by weight of degummed silk with 0.45 part by weight of potassium thiocyanate by soaking the silk with an 8 per cent aqueous solution of potassium thiocyanate, centrifuging and drying, adding the impregnated material to a solution of 1 part by weight of potassium thiocyanate in 103 parts by weight of liquefied ammonia, cooled to about —77° C. and stirring, separating the structureless mass formed, and dissolving said mass in water while evaporating the ammonia still contained in said mass.

10. The process of manufacturing solutions of silk fibroin which comprises degumming silk wastes by means of soap and boiling for 30 minutes with formic acid of 3 per cent strength, dissolving 1 part by weight of potassium nitrate in 41.2 parts by weight of liquefied ammonia, cooling said solution to about —77° C., adding 2 parts by weight of said dried degummed silk, stirring the whole for about 1 hour, separating the structureless mass formed and dissolving said mass in water while evaporating the ammonia still contained in said mass.

HEINRICH FINK.
KURT WEBER.
LOTHAR von WISTINGHAUSEN.